(No Model.)
P. LEONI.
AUTOMATIC DISTRIBUTER FOR LIQUIDS.
No. 520,531. Patented May 29, 1894.
Fig. 1.
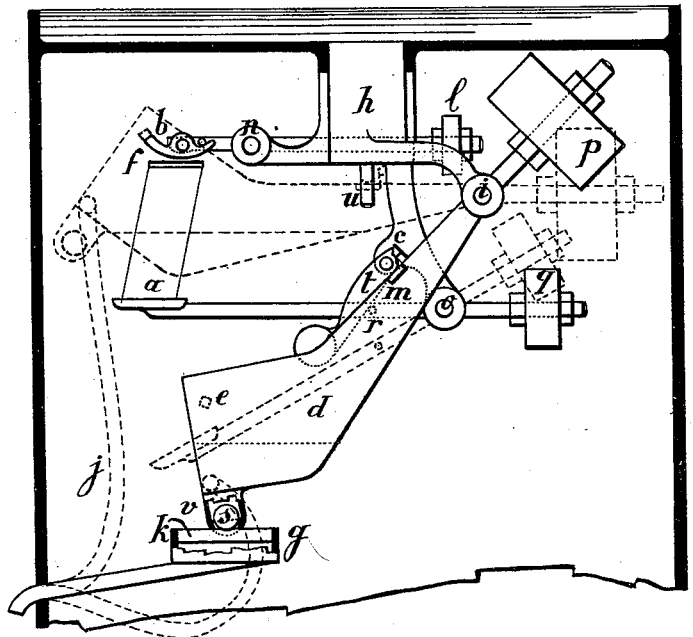
Fig. 1ª.
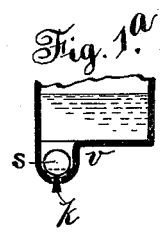
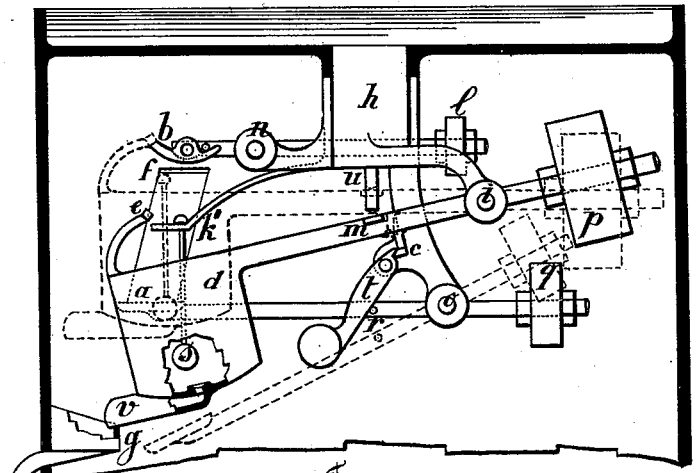
Fig. 2.
Witnesses,
P. A. McBride
C. Severance
Inventor
Phillippe Leoni
by
Wm H Babcock
Attorney

UNITED STATES PATENT OFFICE.

PHILIPPE LEONI, OF PARIS, FRANCE.

AUTOMATIC DISTRIBUTER FOR LIQUIDS.

SPECIFICATION forming part of Letters Patent No. 520,531, dated May 29, 1894.

Application filed March 27, 1893. Serial No. 467,807. (No model.) Patented in France June 16, 1892, No. 222,394, and in England February 3, 1893, No. 2,407.

*To all whom it may concern:*

Be it known that I, PHILIPPE LEONI, a citizen of France, residing at Paris, in the Department of the Seine, France, have invented certain new and useful Improvements in Automatic Distributers for Liquids, (for which I have obtained Letters Patent in France, No. 222,394, dated June 16, 1892, and in England, No. 2,407, dated February 3, 1893;) and I do hereby declare the following to be a full, clear, and exact description of the invention, such as will enable others skilled in the art to which it appertains to make and use the same.

This system of automatic liquid delivery apparatus is characterized by the employment of an improved pan or bucket for liquids which under the influence of any exterior impulse is directly actuated so as to open a suitable valve which supplies the liquid and delivers it outside. The following description and the accompanying drawings will enable the means whereby this is effected to be understood.

Figure 1 is a vertical section through the receptacle and shows the delivery mechanism actuating a bucket in the form of a shoe. Fig. 1$^a$ represents a section of the lower part of the bucket, showing the manner in which the knife $k$ strikes the valve $s$. Fig. 2 is a view of the mechanism actuating the pan or bucket, which is in the form of a pan or pail, and has a shorter travel.

Similar letters indicate the same parts and the following description applies to both arrangements, which only differ in the form of the pan or bucket.

The full lines show the position of the movable parts when the apparatus is at rest and before the exterior impulse to measure out the liquid and deliver it outside has been imparted thereto, while the dotted lines represent the other position of such movable parts, when the bucket is filled and in direct connection with the delivery valve. In either case the fall on to the plate $a$ of the coin (or token) introduced through the slot $f$ communicates an oscillating movement to the lever $o$, the effect of which is to remove the pin $r$, thus unlocking the catch $t$, which consisted of a pivoted weighted lever provided with a nose engaging the stop $c$ formed on the body of the pan or bucket $d$. The latter then under the action of the counterbalance $p$ rises, turning round the axis $i$ on which it is pivoted; and remains stationary in the raised position (indicated in dotted lines) by the pin $e$ catching on the tumbler $b$, on the end of the lever $n$, $l$, which can turn round the axis $n$, and is counterbalanced by weight $l$. In the upward movement of the pan or bucket $d$, the bottom thereof, or a stop thereon, or a bar $m$ carried thereby (or by other suitable means) acts upon the rod $u$ of a delivery valve $h$, so as to raise the same to allow the liquid to flow directly into the pan or bucket. When the weight of the liquid which flows is sufficient to overcome the counterpoise $l$, the pan or bucket $d$ descends by turning round its axis $i$, and empties itself into the funnel $g$ which delivers the liquid to the outside of the apparatus. The plate $a$ has under the action of its counterpoise $q$ resumed its normal position, so that the pin $r$ is in place to insure the catch $t$ engaging stop $c$, which fixes the pan or bucket $d$ in its lowered position, so that the mechanism is then ready to be operated again.

In the modification shown in Fig. 2 the form of pan or bucket $d$ and also the means for opening the emptying orifice by means of a spherical valve $s$ are modified.

In Fig. 1 the shape of the pan or bucket $d$ is such that the level of the liquid does not reach the opening $v$ before it descends; when this occurs the liquid forces the free spherical valve $s$ against its seat, and closes all issue until the pan or bucket arrives at the end of its descent, when the blade or knife edge $k$ raises the spherical valve so as to allow the liquid to pass into funnel $g$.

In the exceptional case where the contact of the liquid with india-rubber is immaterial, the spherical valve $s$ may be abolished and an india-rubber tube $j$ fitted to the exit orifice $v$, the other end of such tube being connected directly to the delivery tube leading to the outside of the apparatus.

In the arrangement shown in Fig. 2, the spherical valve $s$ is not free, but is suspended by a rod (or small chain) from a fork $k'$, so that the pan or bucket in its upward travel comes in contact therewith and the communication between the exit orifice $v$ and the interior of the pan or bucket $d$ is closed. The latter is therefore suitably closed, to receive the liquid supplied through valve $h$; but when it descends again, in its travel it leaves the spherical valve $s$ behind, so that the liquid can then pass through the exit orifice $v$ into the funnel $g$. This arrangement enables the extent of movement of the parts of the mechanism to be considerably reduced, so that such parts may be arranged in a receptacle of smaller dimensions, such as a bottle for example.

A counter may be suitably arranged and connected with the mechanism so as to register the volume delivered.

The quantity of liquid at each operation of the plate $a$ and the pan or bucket $d$ may be varied by adjusting the weight of counterpoise $l$, and by its position in relation to the axis of rotation $n$.

Having now particularly described and ascertained the nature of the said invention and in what manner the same is to be performed, I declare that what I claim is—

In an apparatus for automatically delivering liquids the combination with a pivoted delivery bucket, of a reservoir mounted above said bucket, a valve in said reservoir operated by the ascent of said bucket so that the latter receives a fixed quantity of liquid, a pivoted weighted lever, a tumbler $b$ mounted thereon to engage a projection of said bucket, a pivoted catch $t$ for supporting said bucket, means for actuating said catch to release said bucket, and a valve $s$ and its support $k'$ for causing the delivery of the contents of said bucket.

In testimony whereof I affix my signature in presence of two witnesses.

PHILIPPE LEONI.

Witnesses:
 ROBT. M. HOOPER,
 LOUIS LOCKERT.